(12) United States Patent
Mao et al.

(10) Patent No.: US 7,808,299 B2
(45) Date of Patent: Oct. 5, 2010

(54) SWITCHING POWER CONVERTER WITH REDUCED SWITCHING LOSSES

(75) Inventors: Hong Mao, San Jose, CA (US); Geof Potter, New Castle, NH (US); Vijay Phadke, Metro Manila (PH); Gordon Currie, Metro Manila (PH); Arlaindo Vitug Asuncion, Parañaque (PH)

(73) Assignee: Astec International Limited, Kwun Tong, Kowloon, Hong Kong (CN)

( * ) Notice: Subject to any disclaimer, the term of this patent is extended or adjusted under 35 U.S.C. 154(b) by 368 days.

(21) Appl. No.: 11/956,677

(22) Filed: Dec. 14, 2007

(65) Prior Publication Data
US 2009/0153111 A1   Jun. 18, 2009

(51) Int. Cl.
H02J 3/38 (2006.01)
(52) U.S. Cl. .......... 327/530; 327/434; 363/127
(58) Field of Classification Search .......... 327/108, 327/107, 190, 191, 299, 530, 536, 365, 434; 363/21.03, 21.06, 50–55, 56.01, 57, 58, 60, 363/127; 323/222, 225, 240, 282–286, 274
See application file for complete search history.

(56) References Cited

U.S. PATENT DOCUMENTS

| 6,529,354 B1 | 3/2003 | Shteynberg et al. | |
| 6,791,394 B2 * | 9/2004 | Deboes et al. | 327/536 |
| 7,190,210 B2 * | 3/2007 | Azrai et al. | 327/536 |
| 7,274,241 B2 * | 9/2007 | Ho et al. | 327/381 |
| 2004/0178785 A1 | 9/2004 | Sutardja et al. | |

OTHER PUBLICATIONS

European Search Report dated Apr. 2, 2010 in European Application No. EP08253987.
Abu-Quahouq J A et al: "Maximum Efficiency Point Tracking (MEPT) Method and Dead Time Control" Power Electronics Specialists Conference, 2004. PESC 04. 2004 IEEE 35T H Annual Aachen, Germany Jun. 20-25, 2004, Piscataway, NJ, USA, IEEE US, Jun. 20, 2004, pp. 3700-3706 vol. 5, XP010738305 ISBN: 978-0-7803-8399-9.
Wisam Al-Hoor et al: "Adaptive Variable Switching Frequency Digital Controller Algorithm to Optimize Efficiency" Circuits and Systems, 2007. ISCAS 2007. IEEE International Symposium O N, IEEE, PI, May 1, 2007, pp. 781-784, XP0311813777 ISBN: 978-1-4244-0920-44.

* cited by examiner

Primary Examiner—Rajnikant B Patel
(74) Attorney, Agent, or Firm—Harness, Dickey & Pierce, P.L.C.

(57) ABSTRACT

A switching power converter has at least one electronic power switch. To minimize switching losses and optimize efficiency, the gate drive voltage level used to drive the electronic power switch is optimized. In an aspect, a digital controller generates optimizes the gate drive voltage using efficiency optimization algorithms, which in an aspect are programmed in the digital controller. In accordance with an aspect of the present disclosure, the switching power supply has at least two electronic power switches coupled in parallel. Optimization algorithms are used to determine the optimum number of switched electronic power switches that are actively being switched at a given time in order to achieve optimized efficiency for condition changes, such as input voltage variation, load and environmental temperature changes. In an aspect, the algorithms are programmed in a digital controller chip. In an aspect, both gate drive voltage level and the number of electronic power switches being actively switched at a given time are optimized.

29 Claims, 6 Drawing Sheets

SWITCHING POWER CONVERTER WITH REDUCED SWITCHING LOSSES

FIELD

The present disclosure relates to power converters, particularly DC-DC power converters having one or more electronic power switches.

BACKGROUND

The statements in this section merely provide background information related to the present disclosure and may not constitute prior art.

The ability of a digital controller to perform sophisticated algorithms makes it easy to apply adaptive control algorithms where system parameters can be adaptively adjusted in response to system behavior to achieve better performance. An adaptive controller is therefore intuitively a controller that can modify its behavior after changes in the control plant or in the environment. Conversion efficiency is one of the most important specifications for power supplies. Adaptive efficiency algorithms are much easier implemented with digital controllers in power supplies.

With the increased switching frequency of switching power supply, the switching-related power loss keeps increased resulting in lower power conversion efficiency. Among those switching-related power losses, switching loss dominates. In order to reduce the switching loss, many topologies have been developed. As a part of switching-related loss, the drive loss of switching devices is relatively independent of load. The drive loss usually does not play the key role at full load conditions. However, at very light load, the drive loss makes up a much higher percentage of the total power loss, especially at high-current high-switching-frequency applications, because low on-resistance FETs are used with the result of high total gate charge Qg and drive loss. Multiple FETs in parallel also increase the total gate charge and drive loss.

SUMMARY

In accordance with an aspect of the present disclosure, a switching power converter has at least one electronic power switch. To minimize switching losses and optimize efficiency, the gate drive voltage level used to drive the electronic power switch is optimized. In an aspect, a digital controller generates optimizes the gate drive voltage using efficiency optimization algorithms, which in an aspect are programmed in the digital controller.

In accordance with an aspect of the present disclosure, the switching power converter has at least two electronic power switches coupled in parallel. Optimization algorithms are used to determine the optimum number of switched electronic power switches that are actively being switched at a given time in order to achieve optimized efficiency for condition changes, such as input voltage variation, load and environmental temperature changes. In an aspect, the algorithms are programmed in a digital controller chip. In an aspect, both gate drive voltage level and the number of electronic power switches being actively switched at a given time are optimized.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1A:
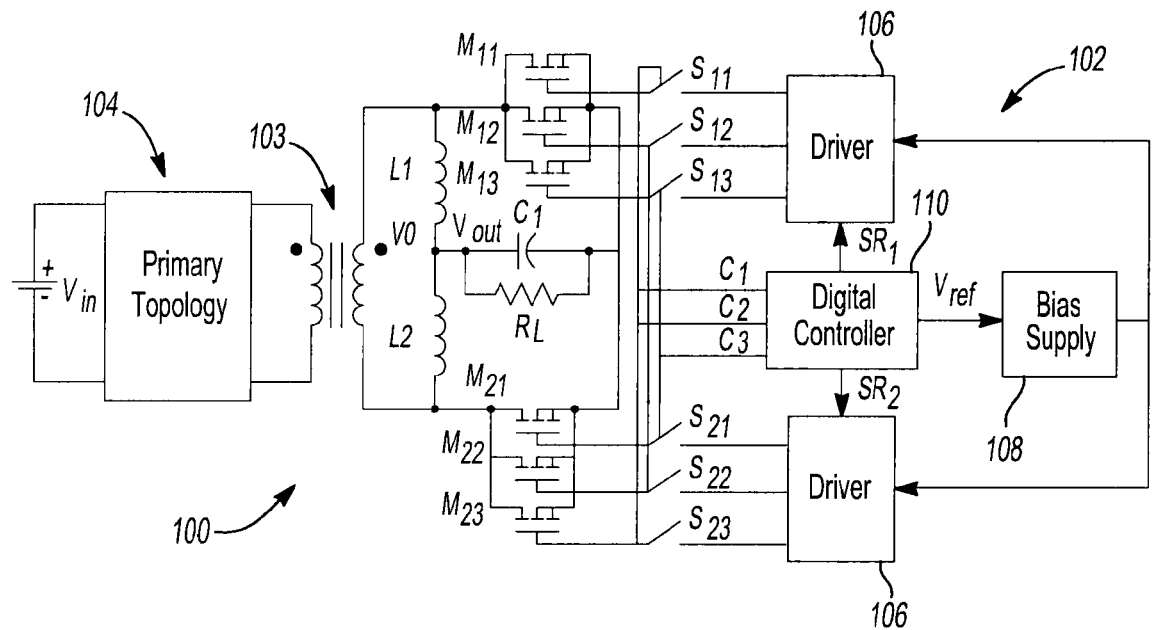
FIG. 1A is a topology of an isolated DC-DC converter having a current doubler rectifier.

The following description is merely exemplary in nature and is not intended to limit the present disclosure, application, or uses. It should be understood that throughout the drawings, corresponding reference numerals indicate like or corresponding parts and features.

The drive loss of FETs can be estimated with the following equation:

$$P_{driver} = n * V_{gs} * Q_g * f \qquad \text{(Equation 1)}$$

where n is the number of paralleled FETs, $V_{gs}$ is the gate drive voltage, $Q_g$ is the total gate charge of a FET, f is the drive frequency. It should be noted that $Q_g$ is significantly dependent on $V_{gs}$. Drive loss is thus proportional to all the four factors. To reduce the drive loss, any one or more of the four parameters can be reduced. However, with a change in any of the parameters, other resulting effects have to be taken into considerations, such as equivalent on-resistance, conduction loss and switching loss.

The level of gate voltage applied to FETs when the switching signal is in the on state is determined by the bias supply voltage of drivers. In state-of-the-art converters, the FETs are driven with constant voltage level. However, this is not always ideal from the conversion efficiency standpoint. When a converter runs at light load, the conduction loss is such decreased and becomes comparable with the FETs drive loss. In this case, the reduction of drive loss with limited increase of conduction loss improves the overall efficiency. The conduction loss is estimated as:

$$P_{con} = \left(\frac{R_{dson}}{n}\right) I_{rms}^2 \quad \text{(Equation 2)}$$

where $R_{dson}$ is on-resistance value of an single FET, $I_{rms}$ is the r.m.s current value of the corresponding channel. n is the number of switched FETs.

When reducing the drive voltage at light load, the total gate charge $Q_g$ is also reduced. According to Equation (1), the drive loss is reduced with reduced drive voltage. However, lowering drive voltage increases the on-resistance of a FET, thus the conduction loss is correspondingly increased. At light load, the r.m.s current value $I_{rms}$ is significantly reduced, and thus the lost conduction loss due to reduced drive voltage can be limited compared to saved gate drive loss. When the lost conduction loss is less than the saved drive loss, efficiency is gained.

According to Equation (1) and (2), it is clear that, in addition to changing the drive voltage, the number of switched FETs n can be changed. In state-of-the-art switching power supplies, multiple FETs are connected in parallel to reduce conduction loss and handle higher power level. Those paralleled FETs are driven by the same signal and turn on and off simultaneously. In other words, all the paralleled FETs are enabled and driven at the same level of gate voltage.

FIG. 1(a) shows an isolated dc-dc converter 100 with a current doubler synchronous rectifier on its secondary side 102, wherein its primary side 104 can be any possible topologies, such as a full bridge, half bridge, push pull and active-clamp forward. In each instance, the primary side 104 has one or more switching FETs (or other electronic switches) according to the applicable topology coupled to a source of DC, $V_{in}$, and to a primary side of transformer 103. In the secondary side 102 of the embodiment shown in FIG. 1, there are 3 FETs in parallel in each side of the synchronous rectifier ($M_{11}$, $M_{12}$, $M_{13}$, $M_{21}$, $M_{22}$, and $M_{23}$). The sources of FETs $M_{11}$, $M_{12}$, $M_{13}$ are coupled to one side of a secondary side of transformer 103 and the sources of FETs $M_{21}$, $M_{22}$, and $M_{23}$ are coupled to the other side. The sources of $M_{11}$, $M_{12}$, $M_{13}$ and the sources of $M_{21}$, $M_{22}$, and $M_{23}$ are also coupled together respective inductors $L_1$, $L_2$ to provide output $V_o$ to a load, designated $R_L$. A filter capacitor $C_1$ is coupled across load $R_L$.

FETs $M_{11}$, $M_{12}$, $M_{13}$, $M_{21}$, $M_{22}$, and $M_{23}$ are driven by two individual drivers 106 which provide a bias voltage, sometimes referred to herein as a gate drive voltage, to the gates of the FETs $M_{11}$, $M_{12}$, $M_{13}$, $M_{21}$, $M_{22}$, and $M_{23}$. A bias supply 108 provides voltage bias to the two drivers 106, and the bias voltage is variable through the voltage reference Vref output by a digital controller 110. For example, increasing the voltage reference Vref of the bias supply 108 leads to the increase of the gate drive voltage level to the gates of FETs $M_{11}$, $M_{12}$, $M_{13}$, $M_{21}$, $M_{22}$, and $M_{23}$. The two drivers 106 act as power amplifiers, and the signals $SR_1$ and $SR_2$ from the digital controller 110 are amplified and fed to the gates of FETs $M_{11}$, $M_{12}$, $M_{13}$, $M_{21}$, $M_{22}$, and $M_{23}$. Between the drivers 106 and the gates of FETs $M_{11}$, $M_{12}$, $M_{13}$, $M_{21}$, $M_{22}$, and $M_{23}$, are six switches $S_{11}$, $S_{12}$, $S_{13}$, $S_{21}$, $S_{22}$, and $S_{23}$ controlled by signals $C_1$, $C_2$, $C_3$ generated by the digital controller 110. Switches $S_{11}$ and $S_{21}$ are controlled by the signal $C_1$, switches $S_{12}$ and $S_{22}$ are controlled by the signal $C_2$, and switches $S_{13}$ and $S_{23}$ are controlled by the signal $C_3$. Controller opens and closes switches $S_{11}$, $S_{12}$, $S_{13}$, $S_{21}$, $S_{22}$ and $S_{23}$ via control signals $C_1$, $C_2$ and $C_3$ to disable or enable FETs M11, M12, M13, M21, M22, M23. For example, if $C_1=0$, the switches $S_{11}$, $S_{21}$ are opened, disabling FETs $M_{11}$, $M_{21}$ and the number of switched FETs on each side is reduced from three to two. In the context of the embodiment of FIG. 1, FETs $M_{11}$, $M_{21}$, are disabled in that open switches $S_{11}$, $S_{21}$ decouple the drive signals from drivers 106 from the gates of FETs $M_{11}$, $M_{21}$ so that the drive signals from drivers 106 are not applied to the gates of FETs $M_{11}$, $M_{21}$.

It should be understood that the six switches can utilize devices other than FETs, such as transistors, IGBTs, and the like.

Figure 1B:
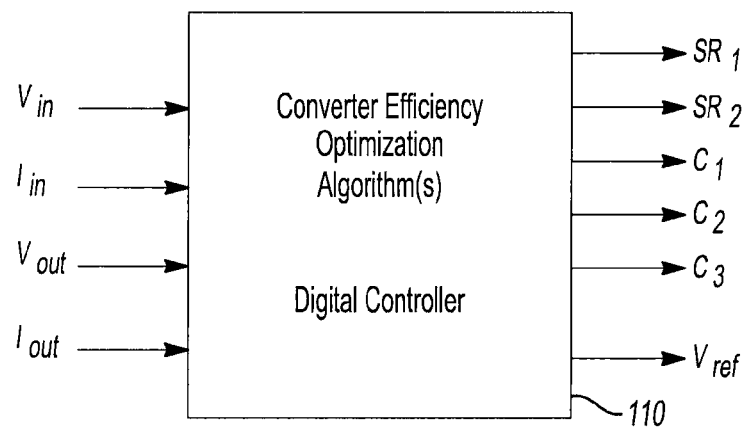
FIG. 1B is a block diagram showing an optimization method(s) in accordance with an aspect of the present controller applied to the converter of FIG. 1A.

FIG. 1(b) shows that the digital controller 110 senses and samples four parameters of the converter 100: input voltage $V_{in}$, input current $I_{in}$, output voltage $V_{out}$ and output current $I_{out}$. This sampling may illustratively be done by digitizing these parameters, such as with analog-to-digital converters. The analog-to-digital converters can be part of digital controller 110 or separate devices. Based on the sampled digital data, an efficiency optimization algorithm(s) programmed in digital controller 110 determines the optimum bias voltage reference $V_{ref}$ to program the bias supply 108 of the drivers 106 and the control signals $C_1$, $C_2$ and $C_3$ to the control switches $S_{11}$, $S_{12}$, $S_{13}$, $S_{21}$, $S_{22}$, $S_{23}$ according to input voltage variation, load changes and environment temperature change.

It should be understood that in accordance with an aspect of the present disclosure, the gate drive voltage level for the electronic switches, such as FETs, of the primary side 104 can also be adjusted, such as by the above referenced optimization algorithms, as can the number of switched electronic switches in the primary side if the primary side has multiple electronic switches connected in parallel.

As mentioned above, the level of voltage applied to a FET gate has effect on the drive loss and conduction characteristics ($R_{dson}$) of the FET, which also results in power loss. These two effects tend to work in opposite directions—a higher gate voltage results in lower $R_{dson}$ but also results in a higher gate charge and drive loss. Because these two effects have opposite slope, there is an optimum value of the FETs gate drive voltage and optimum switched number of FETs to minimize net power loss in switching the FETs.

Figure 2:
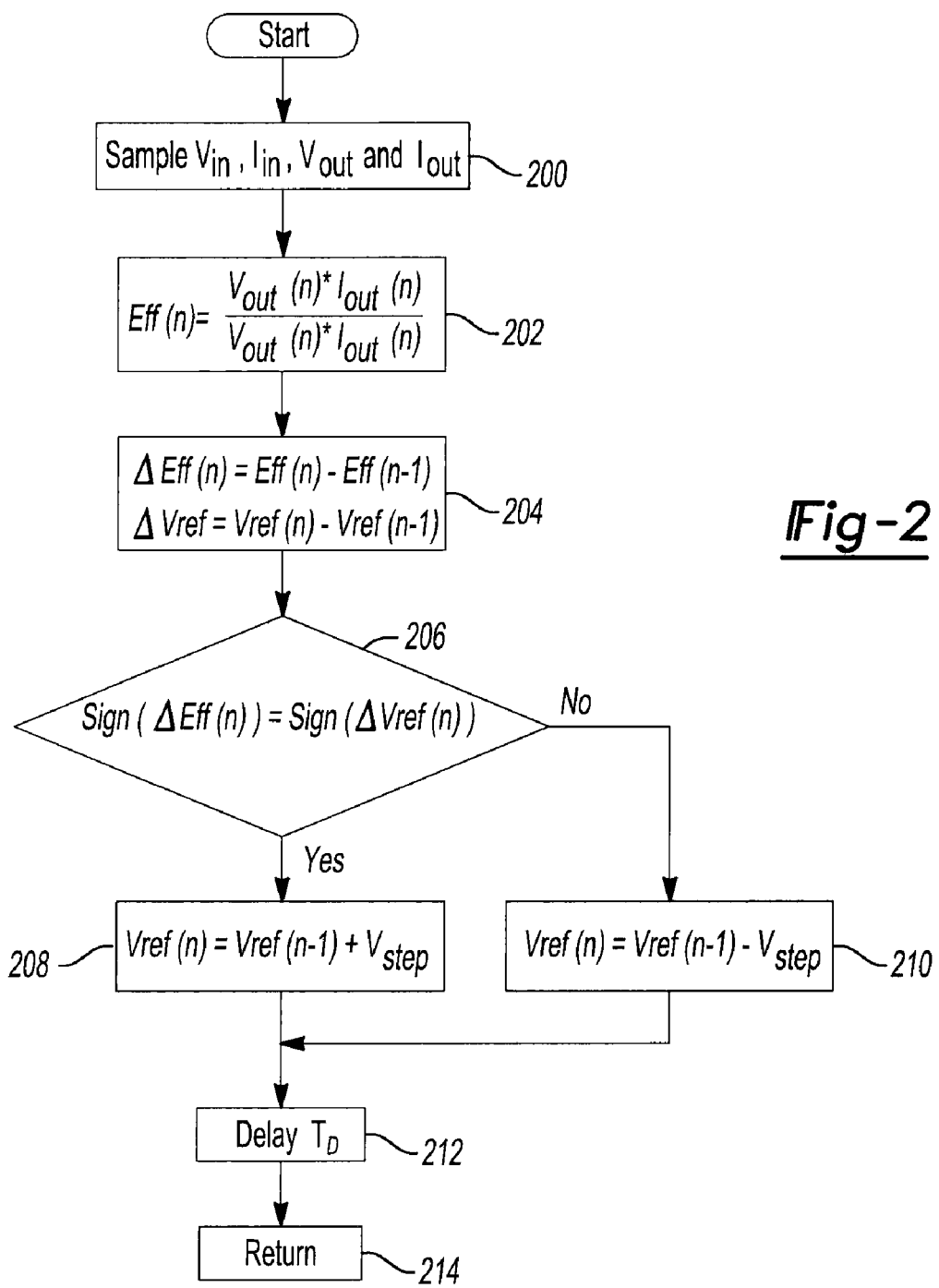
FIG. 2 is a simplified flow chart of a gate drive voltage optimization method in accordance with an aspect of the present disclosure.

FIG. 2 shows a flow chart of a method in accordance with an aspect of the present disclosure to optimize the gate drive voltage level of the switched FETs, such as FETs $M_{11}$, $M_{12}$, $M_{13}$, $M_{21}$, $M_{22}$, and $M_{23}$ of secondary 102 of converter 100 of FIG. 1 and/or the electronic switches of primary side 104. The discussion of the method of FIG. 2 will be with reference to converter 100 of FIG. 1, but it should be understood that the method is applicable to converters having other topologies. At 200, the input voltage $V_{in}$, input current $I_{in}$, output voltage $V_{out}$ and output current $I_{out}$ of converter 100 are sampled and converted to digital data. Next at 202, the present efficiency (Eff(n)) of the converter 100 is calculated and at 204, compared with the previously efficiency (Eff(n−1)) of converter 100 calculated in the previous sampling and adjustment cycle to determine the change in efficiency ($\Delta Eff_{(n)}$) and the present voltage reference (Vref(n)) compared with the previous voltage reference (Vref(n−1)) to determine the change (positive or negative) in the voltage reference ($\Delta$Vref). At 206, the direction to change the bias voltage output by bias supply 108 (and thus the level of the gate drive voltage applied to the gates of the switching FETs) is determined according to the signs of the changes in the efficiency ($\Delta Eff_{(n)}$) of converter 100 and the voltage reference ($\Delta$Vref(n)). The voltage reference Vref(n) is then adjusted up at 208 or down at 210 based on the determined direction of voltage bias change. The method then waits at 212 a time delay $T_D$ time delay in order to allow converter 100 to come to a new steady state and at 214, returns to 200 to start the next sampling and adjustment cycle. With the method of the embodiment of FIG. 2, the peak efficiency of converter 100 is dynamically tracked in term of level of gate drive voltage of the switching FETs.

Figure 3:
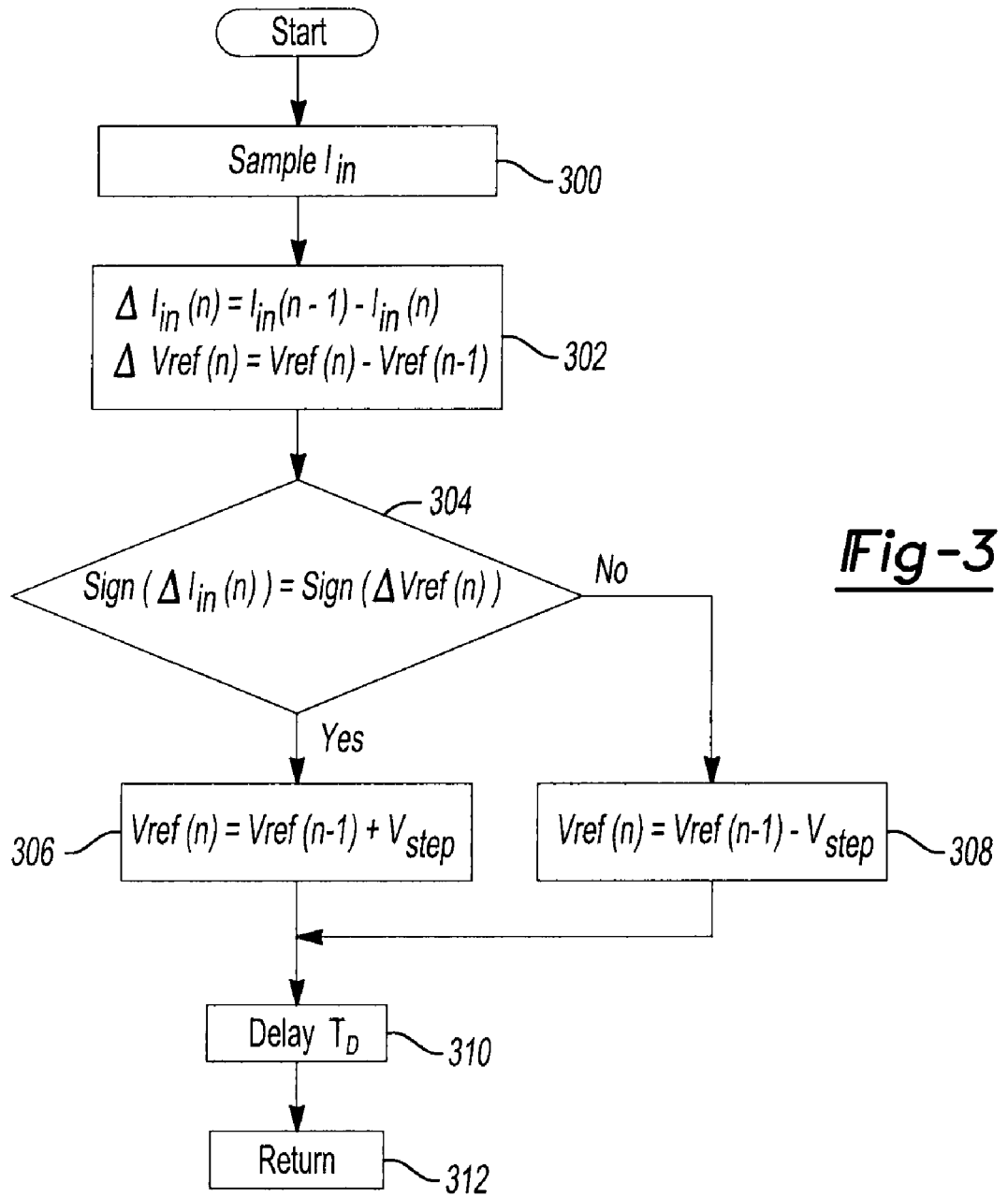
FIG. 3 is a simplified flow chart of a gate drive voltage optimization method in accordance with an aspect of the present disclosure.

FIG. 3 shows a simplified flow chart of a method in accordance with an aspect of the present disclosure to optimize the gate drive voltage level at the gates of the switching FETs, such as FETs $M_{11}$, $M_{12}$, $M_{13}$, $M_{21}$, $M_{22}$, and $M_{23}$ of secondary side 102 of converter 100 of FIG. 1. Assuming the input voltage and load are relatively constant in a sampling and adjustment cycle, and of course the output voltage is regulated and considered constant, the method towards highest efficiency tracking can be simplified as minimum input current tracking. In other words, the method works towards achieving lowest input current by adjusting the level of drive voltage applied to the switching FETs. The principle of operation of this method is similar to the method of FIG. 2. More specifically with reference to FIG. 3, at 300 the input current $I_{in}$ is sampled and converted to digital data. At 302, the present input current $I_{in}(n)$ is compared with the previous input current $I_{in}(n-1)$ to determine the change (positive or negative) in the input current ($\Delta I_{in}$) and the present voltage reference (Vref(n)) compared with the previous voltage reference (Vref(n-1)) to determine the change (positive or negative) in the voltage reference ($\Delta$Vref). At 304, the direction to change the bias voltage output by bias supply 108 (and thus the level of the gate drive voltage applied to the gates of the switching FETs) is determined according to the signs of the changes in the input current ($\Delta I_{in}$) of converter 100 and the voltage reference ($\Delta I_{in}(n)$). The voltage reference Vref(n) is then adjusted up at 306 or down at 308 based on the determined direction of equality of the direction of input current change and voltage bias change. The method then waits at 310 a time delay $T_D$ time delay in order to allow converter 100 to come to a new steady state and then $M_{11}$, $M_{12}$, $M_{13}$, $M_{21}$, $M_{22}$, and $M_{23}$ and at 312, returns to 300 to start the next sampling and adjustment cycle.

The dynamic optimization of the switching FETs gate drive voltage methods discussed above are only some of the methods to maximize converter efficiency. Given that load change has the main influence on the efficiency of the converter, a method to optimize the FETs gate drive voltage in terms of load is described as follows. Basically, the gate drive voltage can be pre-programmed in any desirable way, and according to the load current, the method dynamically finds a voltage value that relatively corresponds to optimum efficiency at this particular load current.

Figure 4:
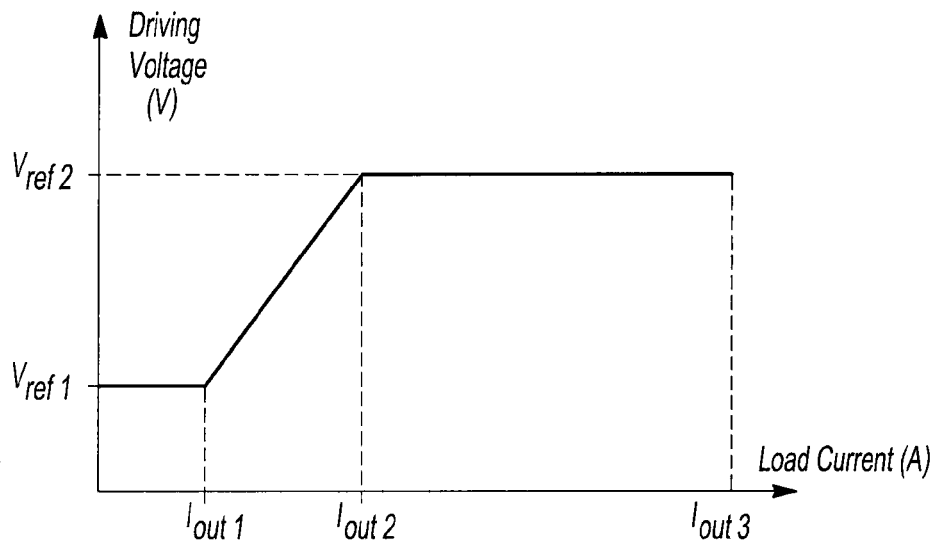
FIG. 4 is a graph showing optimum gate drive voltage versus load current.

In FIG. 4, the quasi-optimum gate drive voltage vs. load current is plotted. According to the curve, the suitable gate drive voltage can be selected for the drive supply reference in order to lower power converter loss. Depending on which section of the curve the load current is in, a drive voltage level can be selected as the bias supply reference $V_{ref}$. If the load current is greater than an upper threshold $I_{out2}$, the maximum voltage reference $V_{ref2}$ is selected; if the load current is smaller than a lower threshold $I_{out1}$, minimum voltage reference $V_{ref1}$ is selected. Otherwise, if the load current falls into range of $I_{out1}<I_{out}<I_{out2}$, the drive voltage can be calculated as:

$$V_{ref} = V_{ref1} + \frac{V_{ref2} - V_{ref1}}{I_{out2} - I_{out1}}(I_{out} - I_{out1}) \quad \text{(Equation 3)}$$

Figure 5:
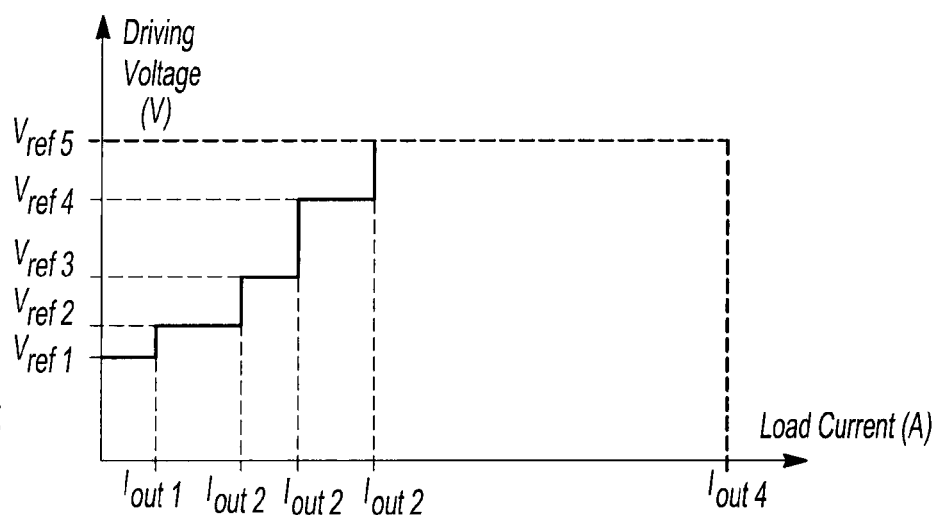
FIG. 5 is a plot of experimental results correlating load current with optimum gate drive voltage.

Another method of adjusting gate drive voltage level to optimize converter efficiency is to generate a lookup table based on experimental results of optimized reference voltages $V_{ref}$ versus load currents $I_{out}$. An example of a p-plot for such a look-up table is shown in FIG. 5, where only 6 pairs of data are plotted. It should be understood that as many pairs of data as desirable could be generated based on experimental test. The lookup table is pre-stored in the memory of digital controller, such as digital controller 110 (FIG. 1) and the load current on the converter is monitored. Once a load change is found, due to a change in load current, the most recent monitored load current is located in the lookup table to look up the optimum reference voltage corresponding to that load current. This optimum reference voltage is sent by digital controller 110 to bias supply 108 as the voltage reference Vref to program bias supply 108. The load monitoring cycle could be long compared to the switching cycle, since the thermal impact is restively slow and the efficiency difference at various drive voltages is not significant. For example, the load current can be sampled only once per second, and minimizing the burden on the resources of digital controller 110. At a sampling rate of once per second, the resources of digital controller 110 consumed by the sampling and adjustment cycle are negligible compared to the resources consumed by other functions of digital controller 110.

In accordance with another aspect of the present disclosure, a method to optimize the efficiency of the switching DC-DC converter controls the number of switched FETs that are actively being switched at any given time. The converter may illustratively be an isolated converter or a non-isolated converter. In isolated converters, the FETs include primary-side FETs, secondary-side FETs, or both; in non-isolated converters, the FETs include both upper-side switches and lower-side ones.

This method is most effective for light loads since the drive loss is nearly independent of load current and thus is a larger percentage of total power loss at light loads. In an illustrative method to change the number of switches, such as switched FETs, that are actively being switched in a converter at a given time, a lookup table is pre-stored in the memory of the digital controller, such as digital controller 110 (FIG. 1). The lookup table may illustratively be generated using experimental results and for example, correlates load current with a relatively optimum number of switches to be actively switched. For a certain range of load current, a relatively optimum number of switches are selected.

Figure 6:
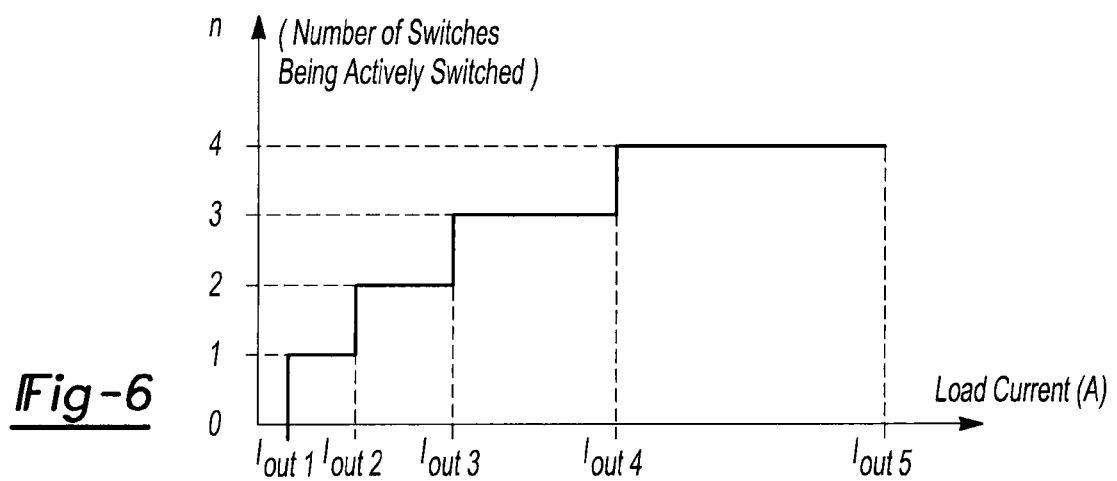
FIG. 6 is a plot of experimental results correlating load current with optimum number of switched FETs being actively switched at a given time.

An example of such a lookup table is shown in FIG. 6 for a converter having four switches, such as in its secondary. Depending on the range of load current, the number of switches actively being switched can be determined according to the table. If the load current is greater than $I_{out4}$, all 4 switches are enabled by control signals from the digital controller. If the load current is in the range of $I_{out3}<I_{out}<I_{out4}$, one of the four switches is disabled. If the load current is in the range of $I_{out2}<I_{out}<I_{out3}$, two of the four switches are disabled. If the load current is in the range of $I_{out1}<I_{out}<I_{out2}$, only a single switch is enabled. At very light load and open load, all switches are disabled. In the case and where the switches are switched FETs, the current only flows through body diodes of the switched FETs.

It should be understood that methods similar to those described with reference to FIGS. 2 and 3 could also be used to optimize the number of switches, such as switched FETs, being actively switched at a given time.

It should be understood that adjusting the gate drive voltage to optimize converter efficiency and optimizing the number of switched FETs being switched at any given time could both be used in the same power converter system.

Figure 7:
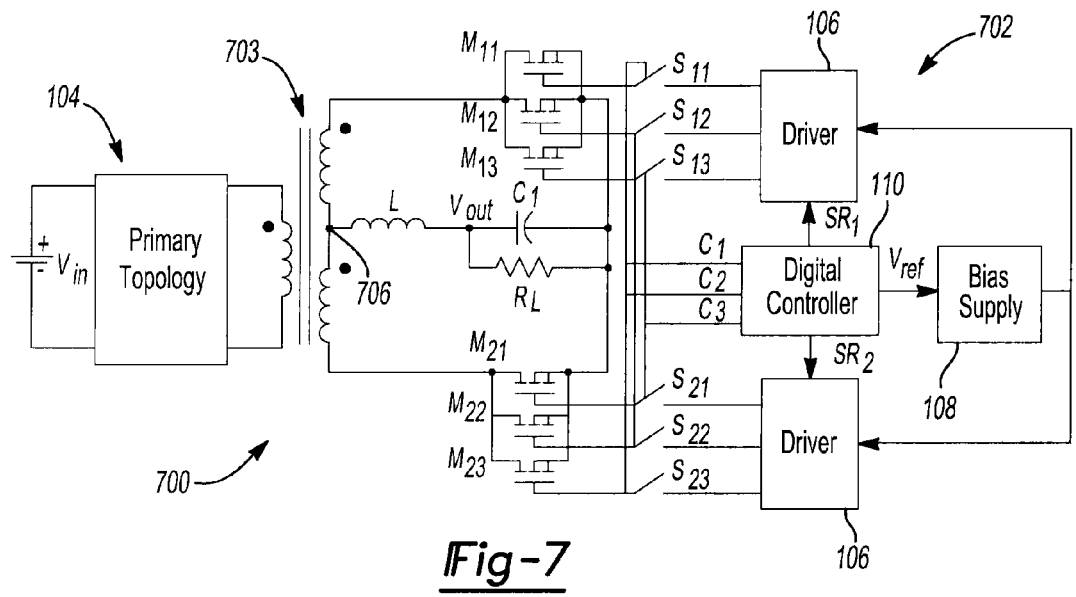
FIG. 7 is a topology of an isolated DC-DC converter having a center-tapped rectifier
Figure 8:
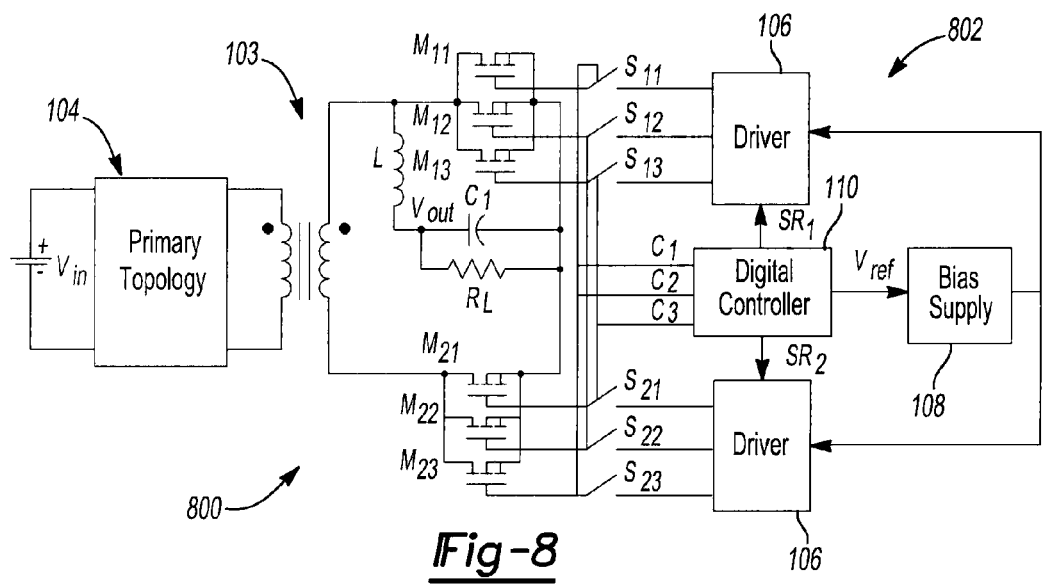
FIG. 8 is a topology of an isolated DC-DC converter having a half-wave rectifier

The methods of optimizing gate drive voltage and optimizing the number of switches being actively switched at any given time can be utilized in any switching power supply using FETs as switching devices. For example, FIG. 7 shows a generalized isolated dc-dc converter 700 having a center-tapped rectifier. Elements in common with the dc-dc converter of FIG. 1 are identified with the same reference numbers and the discussion focuses on the differences. Converter 700 has a primary side 104 and a secondary side 702. Primary side 104, as in the case of converter 100, can have a variety of topologies, such as full bridge, half bridge, push pull and active-clamp forward etc. Secondary side 702 has the sources of FETs $M_{11}$, $M_{12}$, $M_{13}$ coupled to one side of a secondary of transformer 703, which is a center tapped secondary, and the sources of FETs $M_{21}$, $M_{22}$, and $M_{23}$ coupled to the other side of the secondary of transformer 703. A center tap 706 is coupled to one side of inductor L. The output voltage $V_{out}$ of converter 700 is provided on the other side of inductor L and a filter capacitor C1 is coupled between the other side of inductor L and common. The same optimization methods described above can be applied to converter 700.

Similarly, by only changing the center-tapped rectifier of secondary 702 of FIG. 7 to a half-wave forward rectifier, a dc-dc converter 800 having the half-wave rectifier topology is obtained, as shown in FIG. 800. Again, elements in common with converter 100 of FIG. 1 are identified with like reference numbers and the discussion focuses on the differences. Converter 800 has primary side 104 and secondary side 802. In secondary side 802, which is a half-wave rectifier topology, the sources of FETs $M_{11}$, $M_{12}$, $M_{13}$ are coupled to one side of a secondary side of transformer 103 and to one side of an inductor L. The output voltage $V_{out}$ of converter 700 is provided on the other side of inductor L and a filter capacitor C1 is coupled between the other side of inductor L and common. The sources of FETs $M_{21}$, $M_{22}$, and $M_{23}$ are coupled to the other side of the secondary of transformer 103. The same optimization methods described above can be applied to converter 800.

Figure 9A:
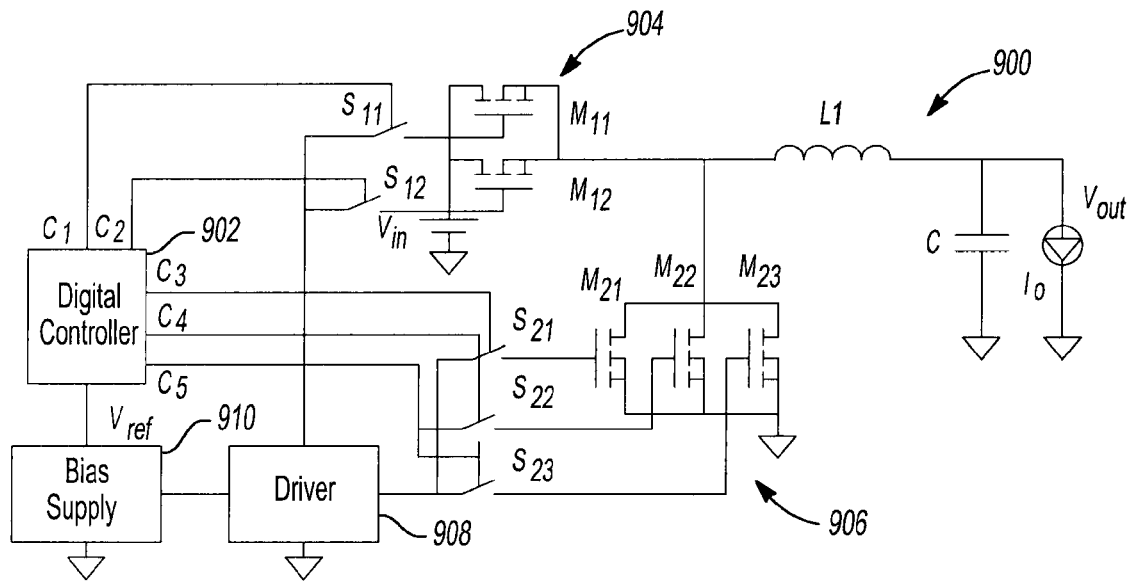
FIG. 9A is a topology of a non-isolated buck converter.
Figure 9B:
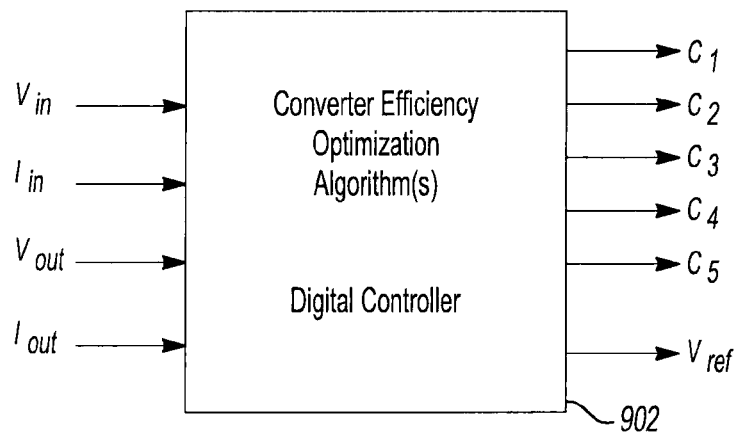
FIG. 9B is a block diagram showing an optimization method(s) in accordance with an aspect of the present controller applied to the converter of FIG. 9A.

The above described optimization methods can also be applied to non-isolated dc-dc converters, such as the buck, boost and buck-boost etc. As an example of a non-isolated dc-dc converter, FIG. 9 shows a buck converter 900 controlled by a digital controller 902. Converter 900 includes a high-side switch 904 and a low-side switch 906. Where the high-side switch 904 includes two FETs $M_{11}$, and $M_{12}$ in parallel, low-side switch 906 includes three FETs $M_{21}$, $M_{22}$ and $M_{23}$ in parallel. The sources of FETs $M_{11}$, and $M_{12}$ are coupled to $V_{in}$ and their drains are coupled to a first side of an inductor L1 and the output (Vout) of converter 900 is provided at the other side of inductor L1. A filter capacitor C is coupled between the other side of inductor L1 and ground. The sources of FETs $M_{21}$, $M_{22}$ and $M_{23}$ are also coupled to the first side of inductor L1 and their drains are coupled to common.

FETs $M_{11}$, $M_{12}$, $M_{21}$, $M_{22}$ and $M_{23}$ are driven by a driver 908 which provides bias voltage to the gates of FETs $M_{11}$, $M_{12}$, $M_{21}$, $M_{22}$ and $M_{23}$. A bias supply 910 provides voltage bias to the driver 908, and the bias voltage is variable through the voltage reference $V_{ref}$ output by a digital controller 902. For example, increasing the voltage reference $V_{ref}$ of the bias supply 910 leads to the increase of the drive voltage level to the gates of FETs $M_{11}$, $M_{12}$, $M_{13}$, $M_{21}$, $M_{22}$, and $M_{23}$. Between the driver 908 and the gates of FETs $M_{11}$, $M_{12}$, $M_{21}$, $M_{22}$, and $M_{23}$, are five switches $S_{11}$, $S_{12}$, $S_{21}$, $S_{22}$, and $S_{23}$ controlled by signals $C_1$, $C_2$, $C_3$, $C_4$, $C_5$ and $C_6$ generated by the digital controller 902. Controller opens and closes switches $S_{11}$, $S_{12}$, $S_{21}$, $S_{22}$ and $S_{23}$ via control signals $C_1$—$C_5$ to disable or enable FETs $M_{11}$, $M_{12}$, $M_{21}$, $M_{22}$, $M_{23}$. It should be understood that the five switches can utilize devices other than FETs, such as transistors, IGBTs, and the like.

The same optimization methods described above can be applied to converter 900, as well as other non-isolated converters. With reference to FIG. 10, based on the sampled data of input voltage $V_{in}$, input current $I_{in}$, output voltage $V_{out}$ and output current $I_{out}$, the methods determine how many FETs $M_{11}$, $M_{12}$, $M_{21}$, $M_{22}$, $M_{23}$ need to be enabled, and/or what the reference voltage $V_{ref}$ is, which determines the gate drive voltage of FETs $M_{11}$, $M_{12}$, $M_{21}$, $M_{22}$, $M_{23}$, in order to achieve optimum efficiency of converter 900.

Compared with power converters having switches with fixed drive voltage level and where the all the switches FETs are actively switches, the above described optimization methods improve overall converter efficiency, especially at light loads since drive loss is reduced.

What is claimed is:

1. A method of controlling a switching power converter to reduce switching losses and optimize efficiency, the switching power converter having at least one electronic power switch, comprising:
   determining a level of a gate drive voltage to apply to a gate of the electronic power switch based on at least one operating parameter of the switching power converter and applying the gate drive voltage at the determined level to the gate of the electronic power switch.

2. The method of claim 1, wherein the parameter includes a parameter related to an efficiency at which the switching power converter is operating, the method including:
   a. determining a direction of change in the efficiency of the switching power converter after changing the gate drive voltage level;
   b. comparing the direction of change in efficiency of the switching power converter to the direction of change in the gate drive voltage level; and
   c. decreasing the gate drive voltage level when the direction of change in the gate drive voltage level and the direction of change in the efficiency are opposite and increasing the gate drive voltage level when the direction of change in the gate drive voltage level and the direction of change in efficiency are the same.

3. The method of claim 2 wherein the parameter includes input current and determining the direction of change in the efficiency includes determining the direction of change in the input current.

4. The method of claim 1 wherein the parameter includes an actual load current, and determining the gate drive voltage level includes determining it to apply a first gate drive voltage level when the actual load current is at a first level that is higher than a second level and to apply a second gate drive voltage level that is lower than the first gate drive voltage level when the actual load current is at the second level.

5. The method of claim 1 wherein the parameter includes an actual load current, and determining the gate drive voltage level includes determining it to apply a maximum gate drive voltage level when the actual load current is above an upper threshold, determining the gate drive voltage level to apply a minimum gate drive voltage level when the actual load current is below a lower threshold, and determining the gate drive voltage level to apply a gate drive voltage level between the maximum gate drive voltage level and the minimum gate drive voltage level when the actual load current is between the upper and lower thresholds.

6. The method of claim 5 including determining the gate drive voltage level to apply when the actual load current is between the upper and lower thresholds based on the following equation:

$$V_{ref} = V_{ref1} + \frac{V_{ref2} - V_{ref1}}{I_{out2} - I_{out1}}(I_{out} - I_{out1})$$

where $V_{ref}$ is the gate drive voltage level, $V_{ref1}$ is the minimum gate drive voltage level, $V_{ref2}$ is the maximum gate drive voltage level, $I_{out2}$ is the maximum load current threshold and $I_{out1}$ is the minimum load current.

7. The method of claim 5 including determining the gate drive voltage level to apply when the actual load current is between the upper and lower thresholds by looking up in a lookup table having optimum gate drive voltage levels for different levels of load currents a gate drive voltage level corresponding to the actual load current.

8. The method of claim 1 wherein the power converter includes a plurality electronic power switches coupled in parallel and the parameter includes an actual load current, the method further including increasing a number of the electronic switches that are actively being switched as the actual load current on the power converter increases and decreasing the number of the electronic switches that are actively being switched as the actual load current decreases.

9. The method of claim 8 including determining the number of electronic switches that are to be actively switched by looking up in a lookup table having optimum numbers of electronic switches to be actively switched for different levels of load current a number of electronic switches to be actively switched corresponding to the actual load current.

10. The method of claim 1 wherein the power converter includes a plurality electronic power switches coupled in parallel, the method including:
 a. determining a direction of change in the efficiency of the switching power converter after changing the number of electronic switches being actively switched;
 b. comparing the direction of change in efficiency of the switching power converter to the direction of change in the number of electronic switches being actively switched; and
 c. decreasing the number of electronic switches being actively switched when the direction of change in the number of electronic switches being actively switched and the direction of change in the efficiency are opposite and increasing the number of electronic switches being actively switched when the direction of change in the number of electronic switches and the direction of change in efficiency are the same.

11. The method of claim 10 wherein determining the direction in change of efficiency includes determining a direction in change of input current.

12. A switching power converter, comprising:
 at least one electronic power switch that is switched on and off by a controller that controls a gate drive voltage provided to a gate of the electronic power switch to switch the electronic power switch; and
 the controller determining a level of the gate drive voltage to apply to the gate of the electronic power switch based on at least one parameter of the switching power converter to reduce switching related power loss.

13. The apparatus of claim 12 wherein the controller generates the switching signal at an output that is coupled to an input of a bias supply, an output of the bias supply coupled to the gate of the electronic power switch, the gate drive voltage generated at the output of the bias supply, the controller controlling the bias supply to set the gate drive voltage at the determined level.

14. The apparatus of claim 12, wherein the parameter includes a parameter related to an efficiency at which the switching power converter is operating, the controller:
 a. determining a direction of change in the efficiency of the switching power converter after changing the gate drive voltage level;
 b. comparing the direction of change in efficiency of the switching power converter to the direction of change in the gate drive voltage level; and
 c. decreasing the gate drive voltage level when the direction of change in the gate drive voltage level and the direction of change in the efficiency are opposite and increasing the gate drive voltage level when the direction of change in the gate drive voltage level and the direction of change in efficiency are the same.

15. The apparatus of claim 14 wherein the parameter includes input current and the controller determines the direction of change in the efficiency by the direction of change in the input current.

16. The apparatus of claim 12 wherein the parameter includes an actual load current, and the controller determines the gate drive voltage level to apply a first gate drive voltage level when the actual load current is at a first level that is higher than a second level and to apply a second gate drive voltage level that is lower than the first gate drive voltage level when the actual load current is at the second level.

17. The apparatus of claim 12, wherein the parameter includes an actual load current, the controller determining the gate drive voltage level to apply a maximum gate drive voltage level when the actual load current is above an upper threshold, determining the gate drive voltage level to apply a minimum gate drive voltage level when the actual load current is below a lower threshold, and determining the gate drive voltage level to apply a gate drive voltage level between the maximum gate drive voltage level and the minimum gate drive voltage level when the actual load current is between the upper and lower thresholds.

18. The apparatus of claim 17 wherein the controller determines the gate drive voltage level to apply when the actual load current is between the upper and lower thresholds based on the following equation:

$$V_{ref} = V_{ref1} + \frac{V_{ref2} - V_{ref1}}{I_{out2} - I_{out1}}(I_{out} - I_{out1})$$

where $V_{ref}$ is the gate drive voltage level, $V_{ref1}$ is the minimum gate drive voltage level, $V_{ref2}$ is the maximum gate drive voltage level, $I_{out2}$ is the maximum load current threshold and $I_{out1}$ is the minimum load current.

19. The apparatus of claim 17 wherein the controller determines the gate drive voltage level to apply when the actual load current is between the upper and lower thresholds by looking up in a lookup table having optimum gate drive voltage levels for different levels of load currents a gate drive voltage level corresponding to the actual load current.

20. The apparatus of claim 12 wherein the power converter includes a plurality electronic power switches coupled in parallel, the parameter includes an actual load current, and the controller increases a number of the electronic switches that are actively being switched as an actual load current on the power converter increases and decreases the number of the electronic switches that are actively being switched as the actual load current decreases.

21. The apparatus of claim 20 wherein the controller determines the number of electronic switches that are to be actively switched by looking up in a lookup table having optimum numbers of electronic switches to be actively switched for different levels of load current a number of electronic switches to be actively switched corresponding to the actual load current.

22. The apparatus of claim 12 wherein the power converter includes a plurality electronic power switches coupled in parallel, the controller:
  a. determining a direction of change in the efficiency of the switching power converter after changing the number of electronic switches being actively switched;
  b. comparing the direction of change in efficiency of the switching power converter to the direction of change in the number of electronic switches being actively switched; and
  c. decreasing the number of electronic switches being actively switched when the direction of change in the number of electronic switches being actively switched and the direction of change in the efficiency are opposite and increasing the number of electronic switches being actively switched when the direction of change in the number of electronic switches and the direction of change in efficiency are the same.

23. The apparatus of claim 22 wherein the controller determines the direction in change of efficiency by determining a direction of change in input current.

24. A method of controlling a switching power converter to reduce switching losses and optimize efficiency, the switching power converter having a plurality of electronic power switches coupled in parallel, comprising:
  increasing a number of the electronic power switches that are actively being switched as an actual load current on the power converter increases and decreasing the number of the electronic power switches that are actively being switched as the actual load current decreases; and
  determining the number of electronic power switches that are to be actively switched by looking up in a lookup table having optimum numbers of electronic power switches to be actively switched for different levels of load current a number of electronic power switches to be actively switched corresponding to the actual load current.

25. A method of controlling a switching power converter to reduce switching losses and optimize efficiency, the switching power converter having a plurality of electronic power switches coupled in parallel, comprising:
  a. determining a direction of change in the efficiency of the switching power converter after changing the number of electronic power switches being actively switched;
  b. comparing the direction of change in efficiency of the switching power converter to the direction of change in the number of electronic power switches being actively switched; and
  c. decreasing the number of electronic power switches being actively switched when the direction of change in the number of electronic power switches being actively switched and the direction of change in the efficiency are opposite and increasing the number of electronic power switches being actively switched when the direction of change in the number of electronic power switches and the direction of change in efficiency are the same.

26. The method of claim 25 wherein determining the direction in change of efficiency includes determining a direction in change of input current.

27. A switching power converter, comprising:
  a plurality of electronic power switches coupled in parallel that are switched on and off by a controller that controls gate drive voltages provided to gates of the electronic power switches to switch the electronic switches;
  the controller increasing a number of the electronic power switches that are actively being switched as an actual load current on the power converter increases and decreasing the number of the electronic power switches that are actively being switched as the actual load current decreases; and
  the controller determines the number of electronic power switches that are to be actively switched by looking up in a lookup table having optimum numbers of electronic power switches to be actively switched for different levels of load current a number of electronic power switches to be actively switched corresponding to the actual load current.

28. A switching power converter, comprising:
  a plurality of electronic power switches coupled in parallel that are switched on and off by a controller that controls gate drive voltages provided to gates of the electronic power switches to switch the electronic power switches, the controller:
  a. determining a direction of change in the efficiency of the switching power converter after changing the number of electronic power switches being actively switched;
  b. comparing the direction of change in efficiency of the switching power converter to the direction of change in the number of electronic power switches being actively switched; and
  c. decreasing the number of electronic power switches being actively switched when the direction of change in the number of electronic power switches being actively switched and the direction of change in the efficiency are opposite and increasing the number of electronic power switches being actively switched when the direction of change in the number of electronic power switches and the direction of change in efficiency are the same.

29. The apparatus of claim 28 wherein the controller determines the direction in change of efficiency by a direction in change of input current.

* * * * *